US012548874B2

(12) United States Patent
Jia et al.

(10) Patent No.: US 12,548,874 B2
(45) Date of Patent: Feb. 10, 2026

(54) DIELECTRIC WAVEGUIDE PORT COUPLING STRUCTURE INCLUDING A METALIZED DIELECTRIC BLOCK HAVING A BLIND GROOVE WITH A TRANSMISSION LINE DISPOSED THEREIN

(71) Applicant: Telefonaktiebolaget LM Ericsson (publ), Stockholm (SE)

(72) Inventors: Mengyang Jia, Beijing (CN); Peiguang Lu, Beijing (CN); Juandi Song, Beijing (CN); Jianlan Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 18/563,513

(22) PCT Filed: Jun. 8, 2021

(86) PCT No.: PCT/CN2021/098983
§ 371 (c)(1),
(2) Date: Nov. 22, 2023

(87) PCT Pub. No.: WO2022/257018
PCT Pub. Date: Dec. 15, 2022

(65) Prior Publication Data

US 2024/0250399 A1 Jul. 25, 2024

(51) Int. Cl.
*H01P 1/213* (2006.01)
*H01P 1/20* (2006.01)
(Continued)

(52) U.S. Cl.
CPC .......... *H01P 1/2136* (2013.01); *H01P 1/2002* (2013.01); *H01P 1/2088* (2013.01); *H01P 3/16* (2013.01); *H01P 5/107* (2013.01)

(58) Field of Classification Search
CPC .... H01P 1/2002; H01P 1/2088; H01P 1/2056; H01P 1/2136
(Continued)

(56) References Cited

U.S. PATENT DOCUMENTS

2012/0206213 A1 8/2012 Kojima et al.

FOREIGN PATENT DOCUMENTS

CN 111129671 A 5/2020
CN 111403863 A 7/2020
(Continued)

OTHER PUBLICATIONS

Extended European Search Report for European Patent Application No. 21944528.5, mailed Feb. 6, 2025, 7 pages.
(Continued)

*Primary Examiner* — Benny T Lee
(74) *Attorney, Agent, or Firm* — Withrow & Terranova, PLLC

(57) ABSTRACT

A dielectric waveguide port coupling structure comprising: a surface-metalized dielectric block having a first surface and a second surface that is opposite to the first surface; a blind groove opened in the first surface of the dielectric block; wherein the blind groove comprises a main portion and an extension portion each extending from the main portion toward a corresponding frequency blind hole that is located nearby and opened in the first surface of the dielectric block, the blind groove having its walls metalized; and a coupling through-hole penetrating from a bottom wall of the blind groove to the second surface of the dielectric block, and used for connecting with an input or output device to input or output a signal, wherein the coupling through-hole is metalized. A transmission line is on the bottom wall of the blind groove and extends from the coupling through-hole along a corresponding extension portion.

11 Claims, 10 Drawing Sheets

(51) Int. Cl.
*H01P 1/208* (2006.01)
*H01P 3/16* (2006.01)
*H01P 5/107* (2006.01)

(58) Field of Classification Search
USPC .................................................. 333/202, 135
See application file for complete search history.

(56) References Cited

FOREIGN PATENT DOCUMENTS

| | | | |
|---|---|---|---|
| CN | 212434797 | U | 1/2021 |
| JP | 2020005223 | A | 1/2020 |
| WO | 2020252946 | A1 | 12/2020 |

OTHER PUBLICATIONS

International Search Report and Written Opinion for International Patent Application No. PCT/CN2021/098983, mailed Feb. 24, 2022, 10 pages.

DIELECTRIC WAVEGUIDE PORT COUPLING STRUCTURE INCLUDING A METALIZED DIELECTRIC BLOCK HAVING A BLIND GROOVE WITH A TRANSMISSION LINE DISPOSED THEREIN

This application is a 35 U.S.C. § 371 national phase filing of International Application No. PCT/CN2021/098983, filed Jun. 8, 2021, the disclosure of which is incorporated herein by reference in its entirety.

TECHNICAL FIELD

The present disclosure generally relates to the technical field of communication industry, especially to a radio hardware product and more particularly, to a dielectric waveguide port coupling structure for a dielectric waveguide filter, a duplexer or a multiplexer.

BACKGROUND

This section introduces aspects that may facilitate better understanding of the present disclosure. Accordingly, the statements of this section are to be read in this light and are not to be understood as admissions about what is in the prior art or what is not in the prior art.

With the rapid development of a communication system entering the 5G era, the dielectric waveguide filter has a wide application prospect in the 5G communication equipment for the dielectric waveguide filter enables miniaturization of the communication equipment.

Ceramic waveguide (CWG) technology is especially highly regarded as one of the most promising methods to realize a filter, a duplexer or a multiplexer in 5G communication system. This is because CWG product benefits in both size and cost. Smaller size and lower cost can make the product more competitive. In a ceramic waveguide filter, a high-dielectric-constant ceramic material is filled and plays a role in transmitting signals and providing structural support. The metal material attached to the surface of the ceramic dielectric material serves as an electric wall to play a role in electromagnetic shielding.

Different from a CWG filter, a CWG duplexer or multiplexer has two or more transmission channels and a common port shared by the transmission channels. While, port-coupling at the common port of the duplexer or multiplexer has mutual influence on all transmission channels. Also, a multiplexer needs higher port-coupling value due to the wider passband of the multiplexer. Therefore, a port-coupling realization method is very important for the common port in the CWG duplexer/multiplexer.

Current port-coupling solution for the common port in CWG multiplexer/duplexer is realized by a deep blind hole. This traditional method has its limitation due to relatively low coupling value, less flexibility in port-coupling optimization, and difficulty in production and elaboration of the deep blind hole.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved port-coupling solution for a dielectric waveguide filter or a dielectric waveguide duplexer/multiplexer.

According to a first aspect of the disclosure, there is provided a dielectric waveguide port coupling structure comprises: a surface-metalized dielectric block having a first surface and a second surface that is opposite to the first surface; a blind groove opened in the first surface of the dielectric block, wherein the blind groove comprises a main portion and at least one extension portion each extending from the main portion toward a corresponding frequency blind hole that is located nearby and opened in the first surface of the dielectric block, the blind groove having its walls metalized; and a coupling through-hole penetrating from a bottom wall of the blind groove to the second surface of the dielectric block, and used for connecting with an input or output device to input or output a signal, wherein the coupling through-hole is metalized. In the dielectric waveguide port coupling structure, at least one transmission line is provided on the bottom wall of the blind groove and extends from the coupling through-hole along a corresponding extension portion. Aa first end-less and non-metalized region is formed in the proximity of a transmission area where the at least one transmission line and the coupling through-hole are disposed and extends around a periphery of the transmission area.

In a preferable embodiment, the at least one transmission line is formed by printing or etching (for example, by a laser-etching method) on the bottom wall of the blind groove. The transmission line can be easily applied on the surface of the dielectric waveguide filter or multiplexer/duplexer. This brings much convenience in elaborating coupling value for each transmission channel in production. Engineers can directly rework transmission line width or shape so as to tune the coupling value as desired.

In a preferable embodiment, a second end-less and non-metalized region is formed on the second surface of the dielectric block and extends around the coupling through-hole.

In a preferable embodiment, the first end-less and non-metalized region is formed on the bottom wall of the blind groove or on side walls of the blind groove or in the first surface where the blind groove is opened.

In a preferable embodiment, at least one metalized blind hole for coupling optimization is opened in the bottom wall of the blind groove in an area of the at least one transmission line.

In a preferable embodiment, the dielectric block is a ceramic dielectric block.

According to a second aspect of the disclosure, there is provided a dielectric waveguide filter comprising an electrical waveguide port coupling structure as said in the above, wherein the coupling through-hole serves as an input port or an output port.

According to a third aspect of the disclosure, there is provided a duplexer comprising a dielectric waveguide port coupling structure as said in the above, wherein the coupling through-hole serves as a common port for two transmission channels, and the blind groove comprises a main portion and two extension portions each extending from the main portion in the direction of a first frequency blind-hole for a corresponding transmission channel, with transmission lines being provided on the bottom wall of the blind groove and extending along the extension portions.

In a preferable embodiment, the two extension portions are aligned in a line and extend in opposite directions.

In a preferable embodiment, the coupling through-hole is located between the first frequency blind-holes for the two transmission channels.

According to a third aspect of the disclosure, there is provided a multiplexer comprising a dielectric waveguide port coupling structure as stated in the above, wherein the coupling through-hole serves as a common port for at least three transmission channels, and the blind groove comprises a main portion and at least three extension portions each extending from the main portion in the direction of a first frequency blind-hole for a corresponding transmission channel, with transmission lines being provided on the bottom wall of the blind groove and extending along the extension portions.

In a preferable embodiment, the first frequency blind-holes provided for four transmission channels which share one common port are positioned around the blind groove which comprises four extension portions each extending from the main portion in the direction of a corresponding first frequency blind-hole.

In a preferable embodiment, every two adjacent extension portions form an angle of about 90 degree.

The proposed solution of dielectric waveguide port coupling structure is realized by coupling total energy via the coupling through hole and then dividing the total energy to each transmission channel via transmission lines in the blind groove connected with the coupling through hole. The blind groove with transmission lines operates like a bridge connecting a port (a common port or a normal port) with each transmission channel. The dielectric waveguide port coupling structure according to the present disclosure can realize high coupling value, which is required by wide bandwidth of multiplexer/duplexer at a common port. As compared with traditional port-coupling structure in the form of a deep blind hole, wider coupling bandwidth can be achieved by the present port-coupling structure, and mutual coupling between different transmission channels can be improved as well.

What's more, the dielectric waveguide port coupling structure according to the present disclosure is more convenient and easier to produce.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION OF THE INVENTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The dielectric waveguide port coupling structure according to the invention can be applied to dielectric waveguide filters, dielectric waveguide diplexers, multiplexers or the like.

First Embodiment of a Dielectric Waveguide Port Coupling Structure

Figure 1:
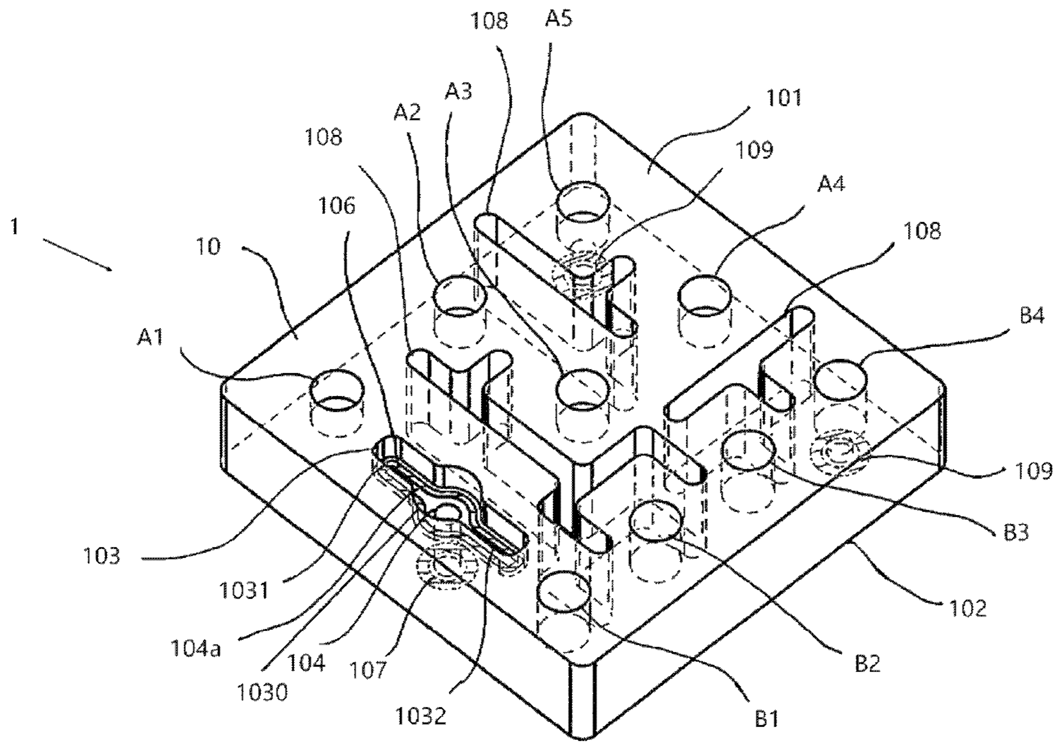
FIG. 1 shows a perspective view of a dielectric waveguide port coupling structure according to a first embodiment of the disclosure for a duplexer.

Application of the Dielectric Waveguide Port Coupling Structure in a Duplexer Provided with Two Transmission Channels FIG. 1 shows an application of a dielectric waveguide port coupling structure according to the present disclosure in a duplexer. The dielectric waveguide port coupling structure 1 comprises a surface-metalized dielectric block 10 (namely, a dielectric block covered with a metal layer for electromagnetic shielding) having a first surface (in the example shown, an upper surface 101) and a second surface (in the example shown, namely, a lower surface 102) that is opposite to the first surface. The dielectric block 10 is made of solid dielectric materials, for example, ceramic. The metal layer coated on the outerside can be a silver layer. Of course, it can be easily conceived that other metal materials than silver (for example, copper, gold, platinum or the like) can be used for the surface metalization of the dielectric block.

Figure 2:
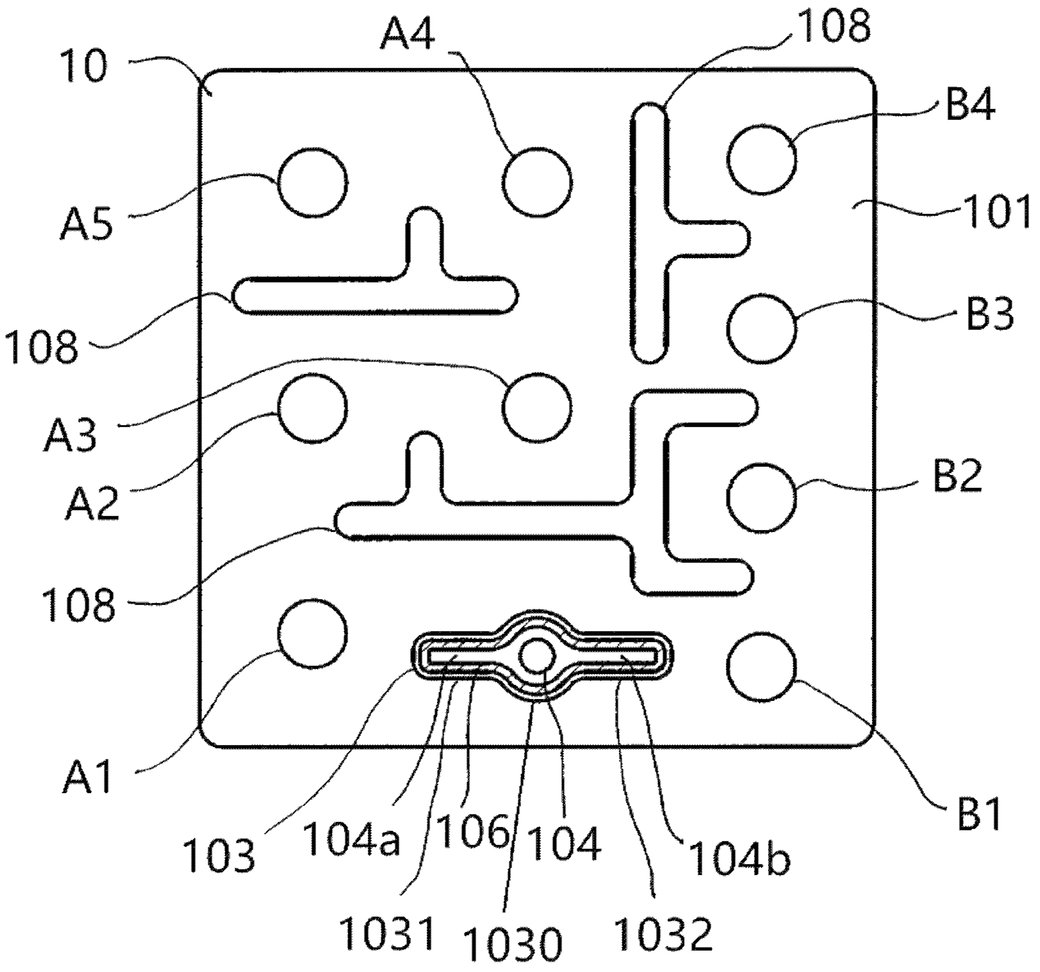
FIG. 2 shows a top view of the duplexer shown in FIG. 1.
Figure 3:
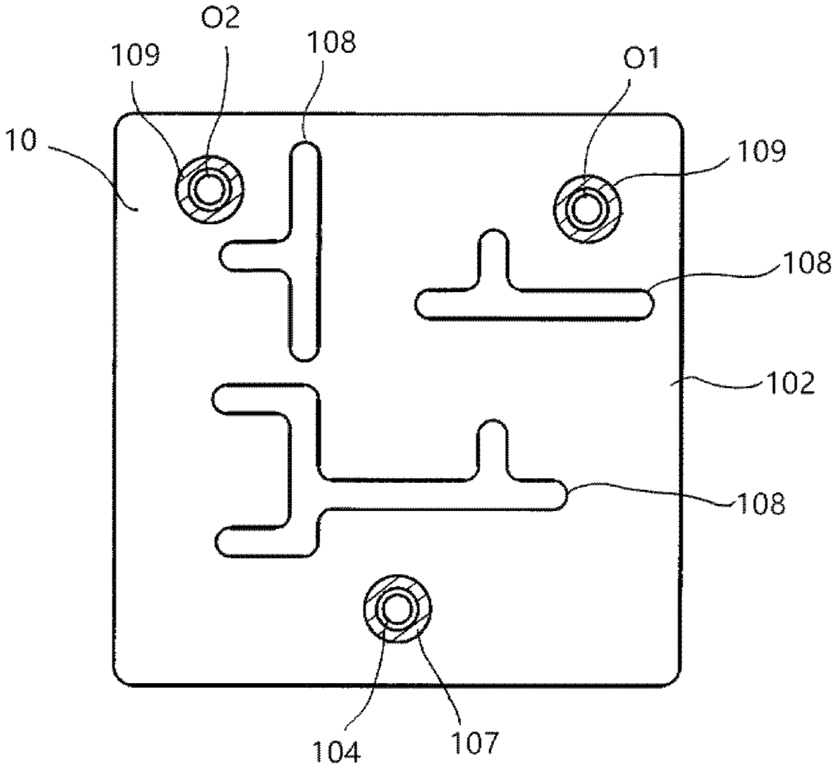
FIG. 3 shows a bottom view of the duplexer shown in FIG. 1.

The dielectric waveguide port coupling structure further comprises a blind groove 103 opened in the upper surface of the dielectric block. As shown in FIGS. 1-3, the blind groove 103 is configured in such a shape that it comprise a main portion 1030 and at least one extension portion (two extension portions 1031, 1032 in the example shown in FIG. 1) each extending from the main portion 1030 of the blind groove toward a corresponding frequency blind hole A1, B1 that is located nearby. From FIG. 1, it can be seen that the main portion 1030 of the blind groove 103 is embodied in the form of a substantially cylindrical recess which opens laterally and joins with the extension portions. A coupling through-hole 104 is provided in the area of the main portion of the blind groove 103 and penetrates from the bottom wall of the blind groove 103 to the lower surface 102 of the dielectric block. The coupling through-hole is metalized and used for connecting with an input or output device (not shown) to input or output a signal. In the example shown, the input or output device can be inserted from the lower surface 102 of the dielectric block 10 through the coupling through-hole 104 and electrically connected with the metalized wall of the coupling through-hole. In this case, the coupling through-hole 104 serves as a common port or a normal port for a filter where it is located.

The frequency blind hole A1, B1, to which the extension portion 1031, 1032 extends, functions as a frequency hole of a first resonator in each transmission channel. In the duplexer shown in FIGS. 1-4, two transmission channels are provided, which share a common port in the form of a coupling through-hole. One transmission channel L1 is embodied in the form of a signal path transmitting signals in the order from the frequency hole A1 to the frequency holes A2, A3, A4 and A5. The other transmission channel L2 is embodied in the form of a signal path transmitting signals in the order from the frequency hole B1 to the frequency holes B2, B3 and B4 (see the topology of the duplexer in FIG. 4). All the frequency holes A1-A5 and B1-B4 are blind holes opened in the upper surface 101 of the dielectric block 10 and have their walls metalized. Frequency holes can be used for optimizing resonating frequency of resonators where they are located.

Figure 4:
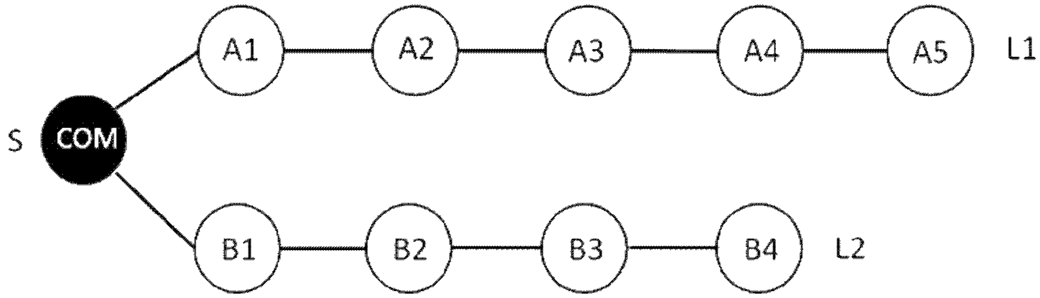
FIG. 4 shows a topology of the duplexer shown in FIG. 1.

Signal-isolating slots 108 are formed in the dielectric block 10, each penetrating from the upper surface 101 to the lower surface 102 of the dielectric block and having walls metalized as well. And these signal-isolating slots 108 are arranged among the frequency holes in such a manner that the radio frequency signal is transmitted through the resonators in a general serpentine pattern and thus transmission channels L1 and L2 can be formed as shown in FIG. 4. The signal-isolating slots 108 can be used for coupling optimization among resonators.

For dividing the power input from the coupling through-hole 104 into the two frequency holes A1, B1 of the first resonators of the transmission channels L1 and L2, transmission lines 104*a*, 104*b* are provided on the bottom wall of the blind groove, as shown in FIGS. 1 and 2. The transmission lines each extend from the coupling through-hole 104 along a corresponding extension portion. In a preferable embodiment, the transmission lines 104*a*, 104*b* are formed by printing or etching (for example, by a laser-etching method) on the bottom wall of the blind groove 103. With these transmission lines 104*a*, 104*b*, mutual coupling influence between different transmission channels can be reduced greatly.

From FIG. 1 and FIG. 2, it can also be seen that a first end-less and non-metalized region 106 is formed in the proximity of a transmission area where the transmission lines 104*a*, 104*b* and the coupling through-hole 104 are disposed, and extends around a periphery of the transmission area. In the transmission area, the coupling through-hole 104 and the transmission lines 104*a*, 104*b* are electrically connected. In the example shown, the first end-less and non-mealized region 106 is located in the bottom area of the blind groove 103. The first end-less and non-metalized region 106 is embodied in the form of a ring-shaped slot having an exposed bottom surface that is provided by the dielectric material of the dielectric block. The first end-less and non-metalized region 106 is formed to surround the metalized transmission area so as to separate and electrically insulate the transmission area from the periphery portion of the metal layer of the surface-metalized dielectric block 10.

On the lower surface 102 of the dielectric block 10, a second end-less and non-metalized region 107 is formed in the shape of an annular slot having an exposed bottom surface that is provided by the dielectric material of the dielectric block also, and extend arounds the coupling through-hole 104, as shown in FIG. 3.

Also, as indicated in FIG. 3, two output ports O1, O2 in the form of blind holes are opened in the lower surface 102 of the dielectric block 10. Non-metal ring-shaped area 109 are formed in the lower surface 102 of the dielectric block 10 to surround the output ports O1, O2, serving the same function as the second end-less and non-metalized region 107 surrounding the coupling through-hole 104. These output ports O1, O2 can function as normal ports coupling respective transmission channels.

The metalization of the blind groove 103 (FIG. 2), the coupling though-hole 104 and outer surfaces of the dielectric block can be conducted in one single step, for example, with one same kind of metal material, with masks being applied in the first end-less and non-metalized region 106, the second end-less and non-metalized region 107 and non-metal ring-shaped area 109.

With the dielectric waveguide port coupling structure 1 according to the present disclosure, the signal power can be input from the coupling through hole 104 serving as a common port, transmitted and divided via the transmission lines 104*a*, 104*b*, passes through the transmission channels L1 and L2 and then can be output through the output ports O1, O2 as shown in FIG. 4. Also, target value of resonating frequency and coupling bandwidth can be obtained by appropriate designs/adjustments of holes/grooves/apertures in the dielectric block in terms of dimension and position.

Figure 5:
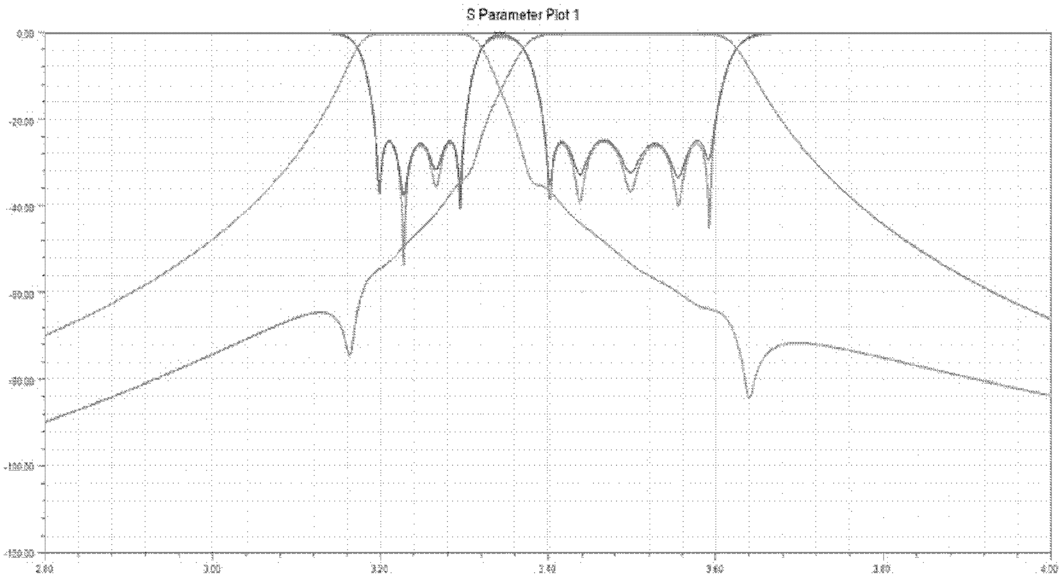
FIG. 5 shows the S parameter of the duplexer shown in FIG. 1.

With the present port coupling structure serving as a common port, it allows to optimize coupling value/bandwidth by modifying the depth/diameter of the coupling through-hole 104, the width/length/shape of the transmission lines 104*a*, 104*b*, the width/length/shape of the first end-less and non-metalized region 106 and the width/length/shape of the blind groove 103. It enables providing a common port coupling structure for coupling energy with two or more transmission channels. Also, the undesired harmonic spur caused by the port coupling structure can be more easily controlled, for example, by optimizing the length of the coupling through-hole 104 and the length of the transmission lines 104*a*, 104*b*. The above-said methods for optimizing coupling value can be applied flexibly and conveniently, thereby allowing optimizing the return loss in the meantime, as shown in FIG. 5.

In addition, the duplexer/multiplexer with the common port coupling structure according to the present disclosure has advantages in size and cost, which therefore has a great potential of being used in a 5G MIMO (multiple input and multiple output) communication system.

Application of the Port Coupling Structure in a Simple Duplexer

Figure 6:
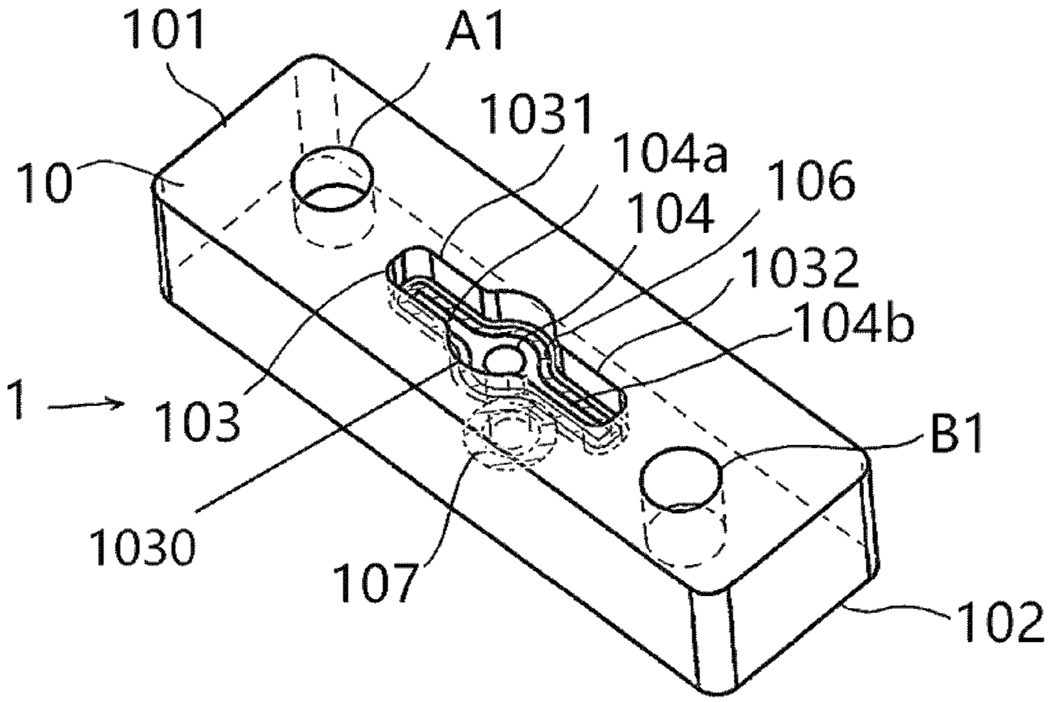
FIG. 6 shows a perspective view of a dielectric waveguide port coupling structure according to first embodiment of the disclosure in a variant of the duplexer.
Figure 7:
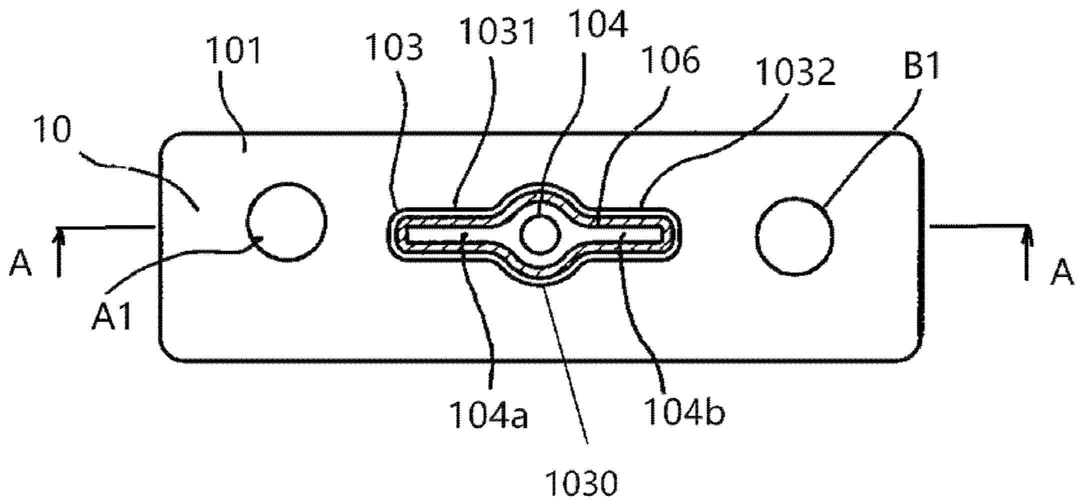
FIG. 7 shows a bottom view of the duplexer as shown in FIG. 6.
Figure 8:
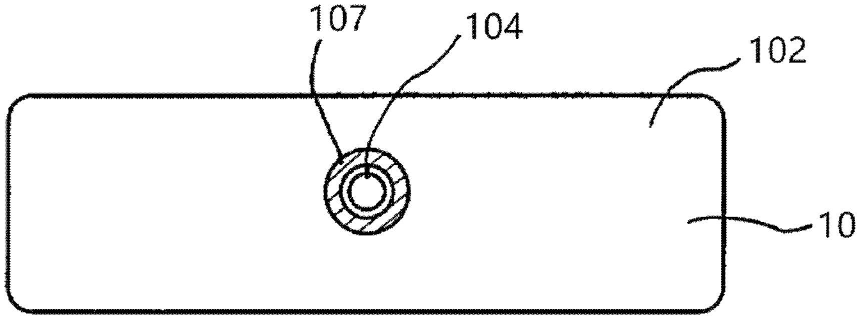
FIG. 8 shows a bottom view of the duplexer as shown in FIG. 6.

As a variant, the duplexer can be designed as having two frequency blind-holes A1, B1 on the upper surface 101 as shown in FIG. 7 of the dielectric block 10, as shown in FIG. 6-8. Similar to that of FIGS. 1-3, the dielectric waveguide port coupling structure 1 comprises a blind groove 103 opened in the upper surface of the surface-metalized dielectric block 10 and a coupling through-hole 104 located in the area of the main portion 1030 of the blind groove 103 and penetrating through the bottom of the blind groove 103 to the lower surface 102 of the surface-metalized dielectric block. The blind groove 103 is configured to have two extension portions 1031, 1032 each extending from the main portion 1030 in the direction of a frequency blind-hole A1, B1. The blind groove 103 is positioned between the two frequency blind-holes A1, B1. Thus, the blind groove is in an elongate shape having two ends approaching the frequency blind holes respectively. Transmission lines 104*a*, 104*b* are provided on the bottom wall of the blind groove 103 and extend from the coupling through hole 104 towards the ends of the extension portions of the blind groove. A first end-less and non-metalized region 106 is formed on the bottom wall of the blind groove 103 in such a manner that the whole area occupied by the transmission lines 104*a*, 104*b* and the coupling through-hole 104 is separated and insulated electrically from the peripheral portion of the metal layer of the surface-metalized dielectric block 10. For forming a capacity coupling, a second end-less and non-metalized region 107 is formed on the lower surface 102 of the surface-metalized dielectric block 10 and extends around the coupling through-hole 104, as shown in FIGS. 6, 8 and 9.

Figure 9:
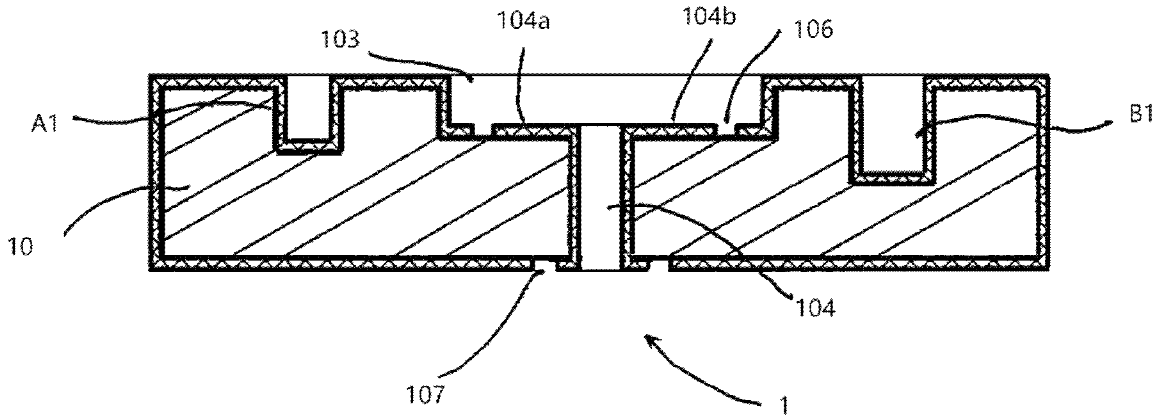
FIG. 9 shows a cross section view of the dielectric waveguide port coupling structure when cut along the line A-A indicated in FIG. 7.

From FIG. 9, it can be clearly seen that both the first end-less and non-metalized region 106 in the blind groove and the second endless and non-metalized region 107 in the lower surface of the dielectric block are in the form of slots having exposed bottom surfaces provided by the dielectric body of the dielectric block.

In the embodiment shown in FIGS. 1 and 6, the two extension portions 1031, 1032 are substantially aligned in a line and extend in opposite directions. Preferably, the coupling through-hole 104 is located between the first frequency blind-holes A1, B1.

Second Embodiment of the Dielectric Waveguide Port Coupling Structure

Figure 10:
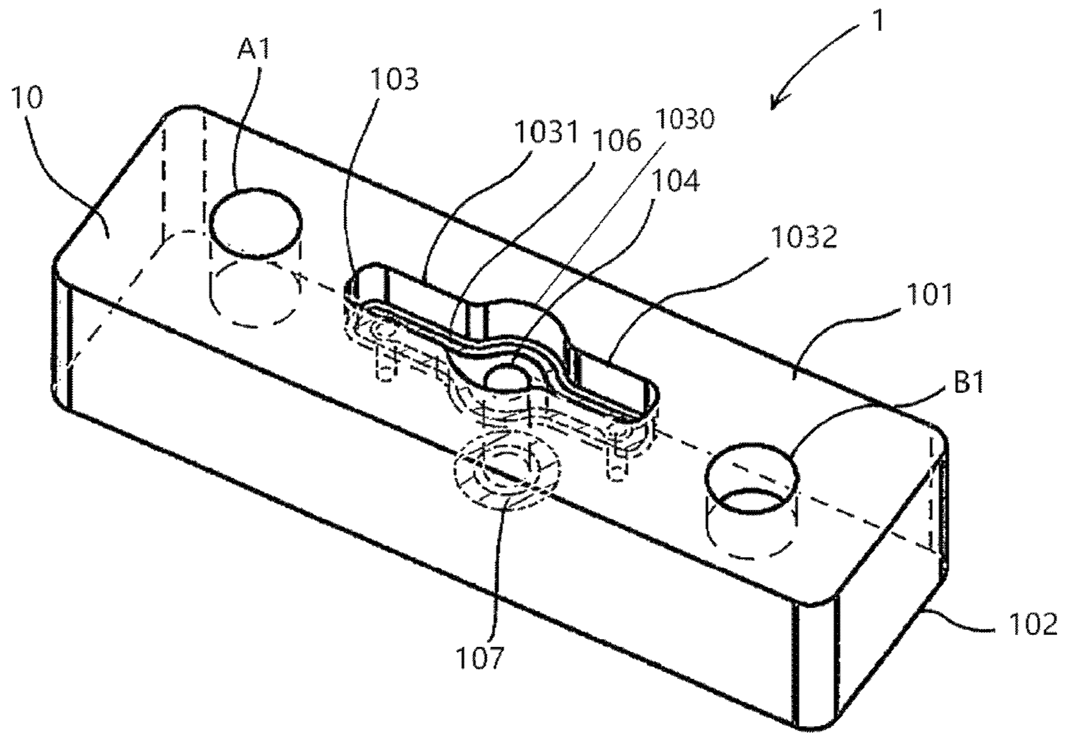
FIG. 10 shows a perspective views of a dielectric waveguide port coupling structure according to a second embodiment of the disclosure.
Figure 11:
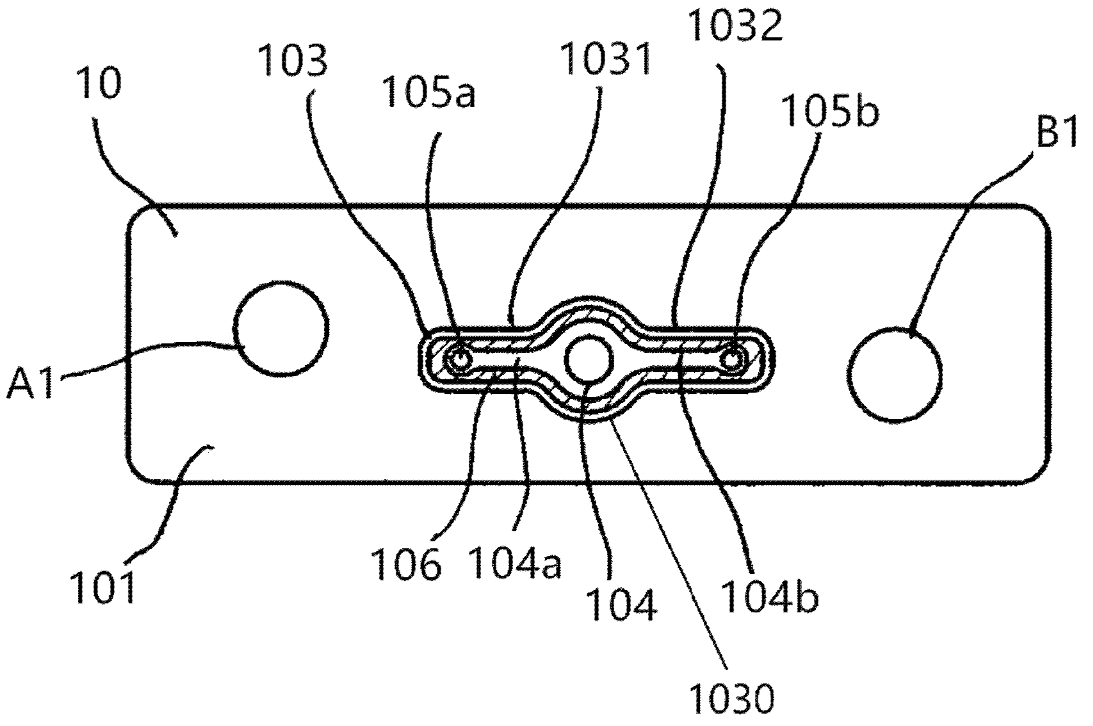
FIG. 11 shows a top view of a dielectric waveguide port coupling structure shown in FIG. 10.
Figure 12:
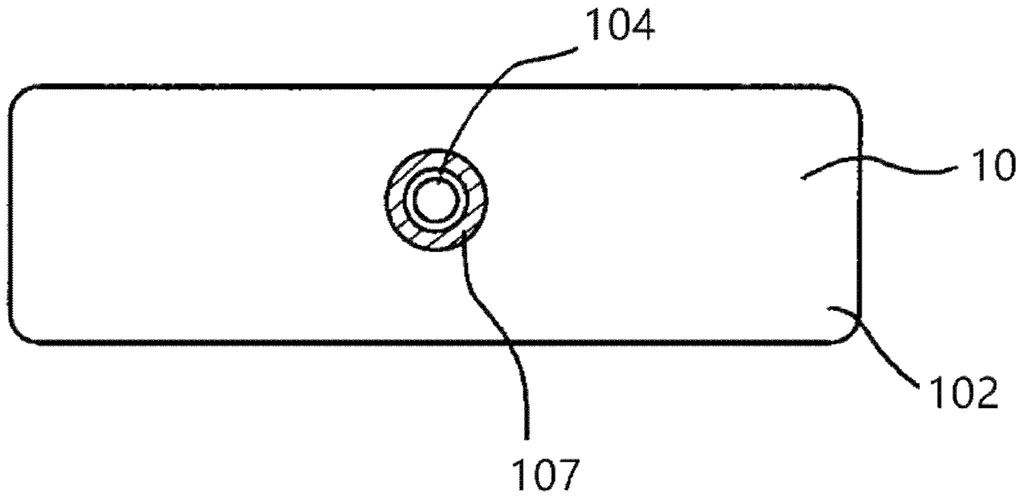
FIG. 12 shows a bottom view of the dielectric waveguide port coupling structure shown in FIG. 10.

FIGS. 10-12 shows a second embodiment of the dielectric waveguide port coupling structure. Different from the dielectric waveguide port coupling structure of the first embodiment, the dielectric waveguide port coupling structure according to the second embodiment of the present disclosure further comprises two metalized blind holes 105*a*, 105*b* (FIG. 11) for coupling optimization which are opened in the bottom wall of the blind groove 103 in the area of the transmission lines 104*a*, 104*b* (FIG. 11) and electrically connected with the transmission lines 104*a*, 104*b*. In the example shown in FIGS. 10 and 11, the blind holes 105*a*, 105*b* for coupling optimization each are positioned in the end area of the transmission lines 104*a*, 104*b*. It can be easily envisaged that the location and number of the blind holes 105*a*, 105*b* for coupling optimization can be changed according to practical needs. For example, port coupling value could be optimized by adding shallow metalized blind holes connected with transmission lines. The depth, diameter and position of these extra blind holes also have influence on the port coupling value.

Figure 13:
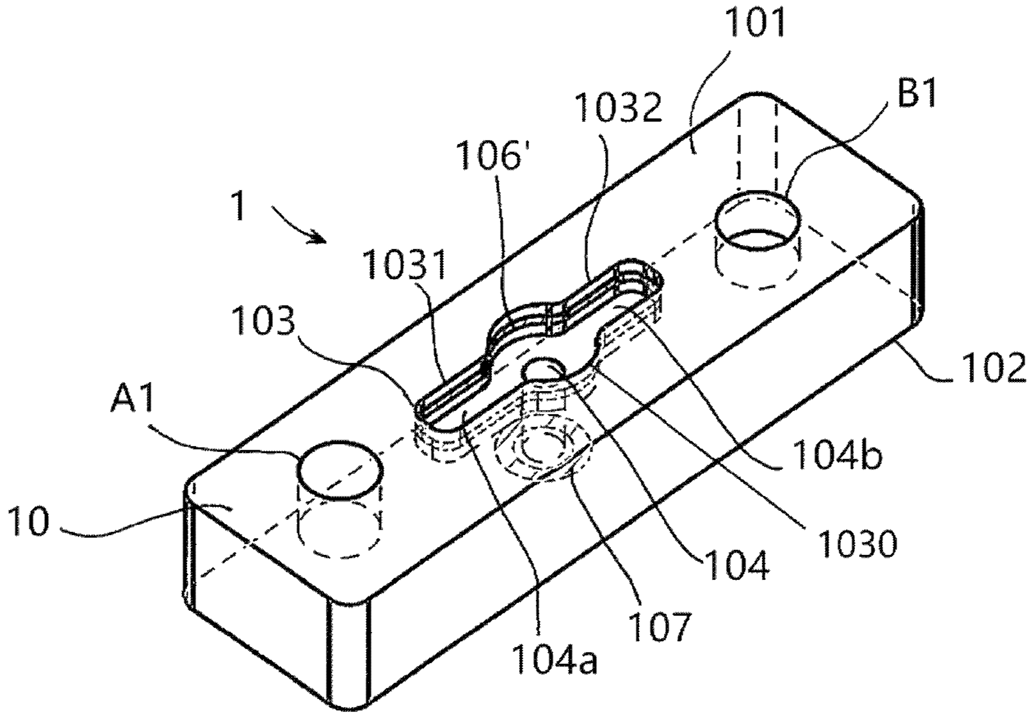
FIG. 13 shows a perspective view of a dielectric waveguide port coupling structure according to a third embodiment of the present disclosure.

Third and Fourth Embodiments of the Dielectric Waveguide Port Coupling Structure FIG. 13 shows a third embodiment of the dielectric waveguide port coupling structure, in which the first endless and non-metalized region 106' is provided on the side walls of the blind groove 103. The first endless and non-metalized region 106', as a whole, extends on the vertical walls of the blind groove 103, and is spaced from the bottom of the blind groove along the contour of the blind groove.

Figure 14:
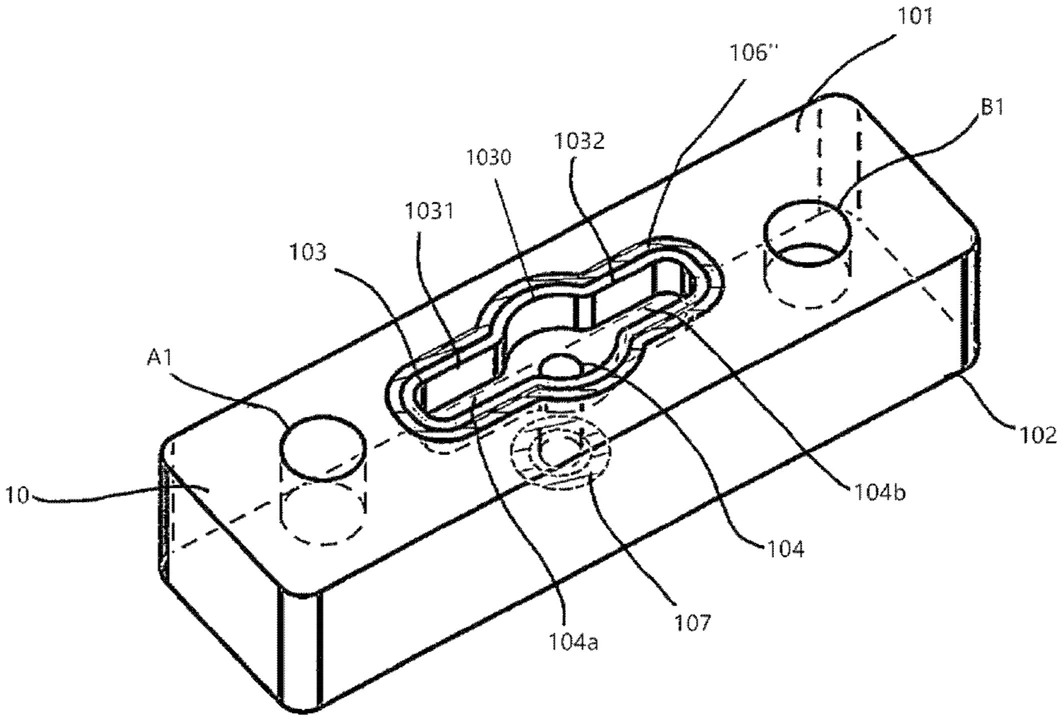
FIG. 14 shows a perspective view of a dielectric waveguide port coupling structure according to a fourth embodiment of the present disclosure.

FIG. 14 shows a fourth embodiment of the dielectric waveguide port coupling structure, in which the first endless and non-metalized region 106" is provided on the upper surface 101 of the surface-metalized dielectric block 10 where the blind groove is opened.

In the example shown in FIG. 14, the first endless and non-metalized region 106" is provided outside the blind groove and extends on the upper surface of the surface-metalized dielectric block, but still surrounds the opening of the blind groove. Hence, the first endless and non-metalized region 106", which is embodied in the form of an annular slot having an exposed bottom surface provided by the dielectric material of the dielectric block (namely, the bottom of the slot is made of the dielectric material which is not covered by any metal layer), forms a circle around the opening of the blind groove 103.

These variants of the first endless and non-metalized region 106', 106" allow to flexibly arrange or adjust the first endless and non-metalized region and then enable optimizing the coupling value in a simple and easy manner. Especially, the example shown in FIG. 14 allows achieving more flexibility in port coupling design and elaboration.

Fifth Embodiment of the Dielectric Waveguide Port Coupling Structure

Figure 15:
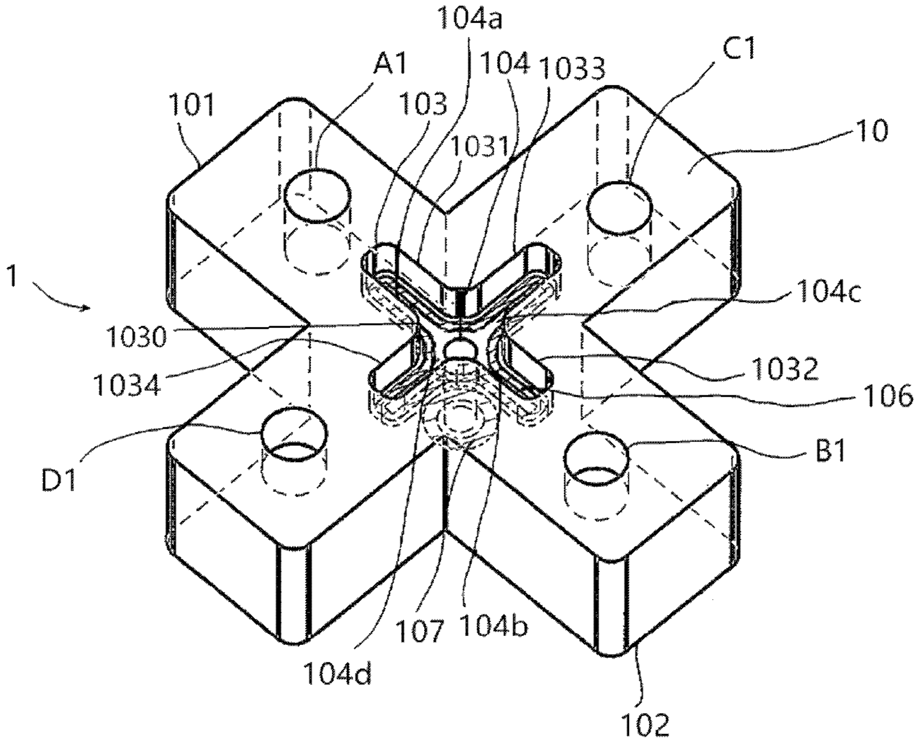
FIG. 15 shows a perspective view of a dielectric waveguide port coupling structure according to a fifth embodiment of the present disclosure.

FIG. 15 shows a dielectric waveguide port coupling structure according to a fifth embodiment of the present disclosure. Different from the first embodiment, the dielectric waveguide port coupling structure of the fifth embodiment comprises a blind groove 103 having a main portion 1030 and four extension portions 1031, 1032, 1033, 1034 each extending from the main portion 1030 in the direction of a corresponding frequency blind-hole A1, B1, C1, D1 (The frequency blind-holes A1, B1, C1, D1 each can serve in a first resonator of each transmission channel). As can be seen from FIG. 15, the blind groove 103 is configured in a cross shape, with the main portion 1030 and thus the coupling through hole 104 being positioned in the central area of the blind groove 103. The multiplexer with such a dielectric waveguide port coupling structure can be configured in a shape of a cross also, with the frequency blind-holes being arranged on arms of the cross-like dielectric block 10 respectively. In the example shown, every two adjacent extension portions 104*a*, 104*b*, 104*c*, 104*d* form an angle of about 90 degree.

Sixth Embodiment of the Dielectric Waveguide Port Coupling Structure

Figure 16:
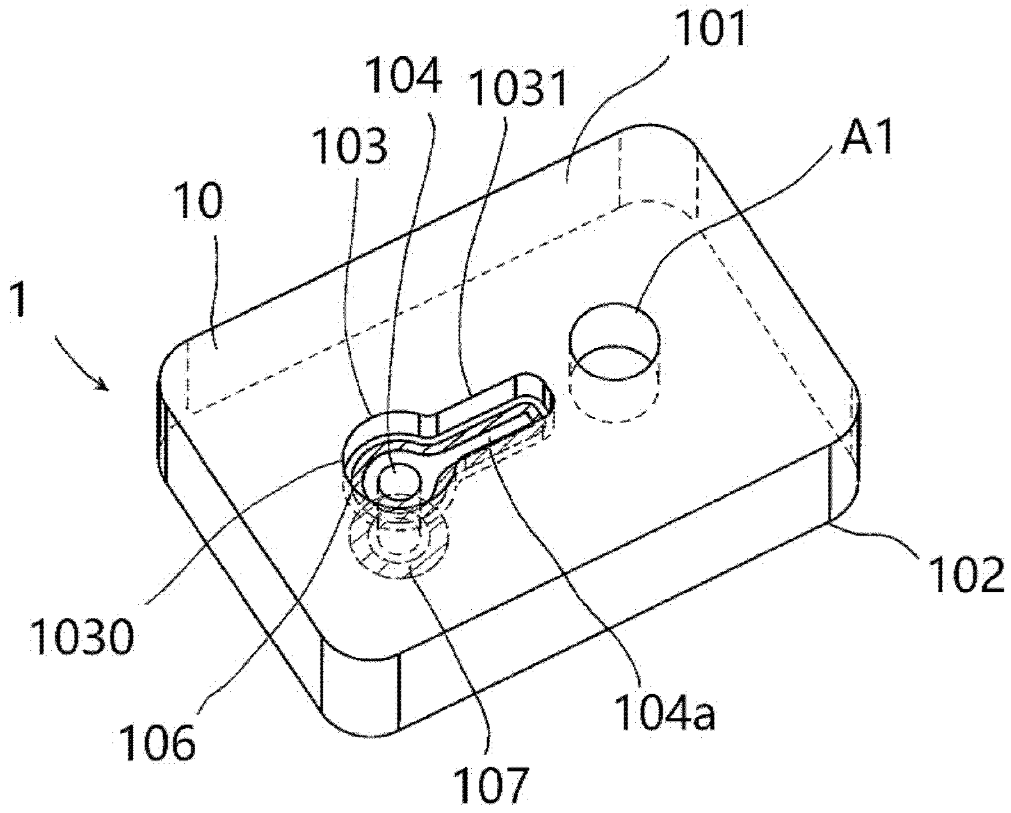
FIG. 16 shows a perspective view of a dielectric waveguide port coupling structure according to a sixth embodiment of the present disclosure.
Figure 17:
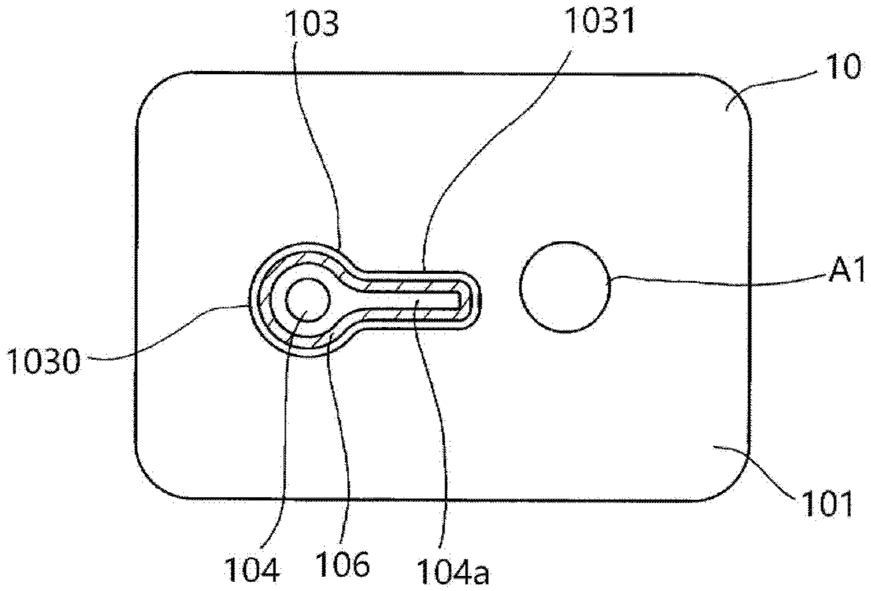
FIG. 17 shows a top view of a dielectric waveguide port coupling structure of FIG. 16.
Figure 18:
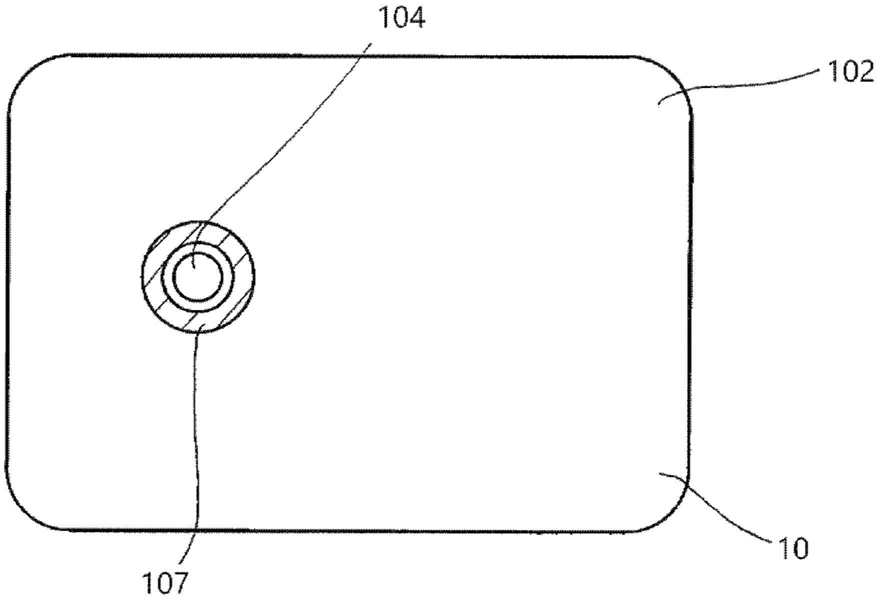
FIG. 18 shows a bottom view of a dielectric waveguide port coupling structure of FIG. 16.

As can be seen from FIG. 16, the blind groove 103 of the dielectric waveguide coupling structure comprises only one extension portion 1031 extending from the main portion 1030 in the direction of a frequency blind-hole A1 located nearby. Corresponding, only one transmission line 104*a* is formed on the bottom wall of the blind groove 103 and extends from the coupling through hole 104 towards the end of the extension portion 1031 that is close to the frequency hole A1. The whole blind groove 103 can be designed in a key shape as a whole, with the main portion 1030 being shaped as a handle portion of the key and the extension portion 1031 being shaped as an insertion portion of the key. Around the transmission area where the coupling though-hole 104 and the transmission line 104*a* are provided, a first end-less and non-metalized region 106 is formed, insulating electrically the transmission area from the peripheral poerion of the metal layer of the surface metalized dielectric block 10 (as shown clearly in FIG. 17). A second endless and non-metalized region 107 is formed in the lower surface 102 of the surface-metalized dielectric block and extends around the corresponding opening of the coupling through hole 104 (as shown clearly in FIG. 18).

In the port coupling structure according to the sixth embodiment of the present disclosure, the coupling through hole 104 can be applied as a normal port (input port or output port) of a dielectric waveguide multiplexer/duplexer/filter to realize wider coupling bandwidth.

As can be seen from the above, the port coupling structure according to the present disclosure can not only be applied to a common port of a multiplexer (for example, a CWG multiplexer), but also to a normal port of multiplexer, even to a normal port of a filter (for example, a CWG filter), which can help to realize wide port coupling value/bandwidth.

As compared with traditional port coupling structure, the port coupling structure according the present disclosure is easier to produce and more convenient to make elaboration. During production of a CWG multiplexer, the coupling through-hole and shallow blind groove structure can be more easily controlled than conventional deep blind holes. And it is convenient to accurately print or etch transmission lines in a shallow blind groove of the port coupling structure according the present disclosure.

Furthermore, for the port coupling structure according the present disclosure, more flexible methods for optimizing port coupling value are available, for example, by adjusting the size and/or position of the coupling through-hole, and/or the width/length/shape of the transmission lines, and/or the width/shape/position of the first/second endless and non-metalized region, and/or the distance between the blind groove and corresponding frequency hole, and/or the size/position of the extra blind holes formed in the area of the transmission lines.

References in the present disclosure to “an embodiment”, “another embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms “first”, “second” and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term “and/or” includes any and all combinations of one or more of the associated listed terms.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. The terms “connect”, “connects”, “connecting” and/or “connected” used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A dielectric waveguide port coupling structure comprises:

- a surface-metalized dielectric block having a first surface and a second surface that is opposite to the first surface;
- a blind groove opened in the first surface of the dielectric block, wherein the blind groove comprises a main portion and at least one extension portion each extending from the main portion toward a corresponding frequency blind hole (A1, B1) that is located nearby and opened in the first surface of the dielectric block, the blind groove having metalized walls; and
- a coupling through-hole penetrating from a bottom wall of the blind groove to the second surface of the dielectric block, and used for connecting with an input or output device to input or output a signal, wherein the coupling through-hole is metalized, wherein, at least one transmission line is provided on the bottom wall of the blind groove and extends from the coupling through-hole along a corresponding extension portion, a first end-less and non-metalized region is formed in the proximity of a transmission area where the at least one transmission line and the coupling through-hole are disposed, and extends around a periphery of the transmission area, and wherein a second end-less and non-metalized region is formed in the second surface of the dielectric block and extends around the coupling through-hole.

2. The dielectric waveguide port coupling structure according to claim 1, wherein the at least one transmission line is formed by printing or etching on the bottom wall of the blind groove.

3. The dielectric waveguide port coupling structure according to claim 1, wherein the dielectric block is a ceramic dielectric block.

4. The dielectric waveguide port coupling structure according to claim 1, wherein the first end-less and non-metalized region is formed on the bottom wall of the blind groove or on side walls of the blind groove or in the first surface where the blind groove is opened.

5. The dielectric waveguide port coupling structure according to claim 1, wherein at least one metalized blind hole for coupling optimization is opened in the bottom wall of the blind groove in an area of the at least one transmission line.

6. A duplexer comprising: a dielectric waveguide port coupling structure, wherein a coupling through-hole serves as a common port for two transmission channels, and a blind groove comprises a main portion and two extension portions each extending from the main portion in the direction of a first frequency blind-hole (A1, B1) for a corresponding transmission channel, with transmission lines being provided on the bottom wall of the blind groove and extending along the extension portions.

7. The duplexer according to claim 6, wherein, the two extension portions are aligned in a line and extend in opposite directions.

8. The duplexer according to claim 7, wherein, the coupling through-hole is located between the first frequency blind-holes (A1, B1) for the two transmission channels.

9. A multiplexer comprising: a dielectric waveguide port coupling structure, wherein a coupling through-hole serves as a common port for at least three transmission channels, and a blind groove comprises a main portion and at least three extension portions each extending from the main portion in the direction of a first frequency blind-hole (A1, B1, C1, D1) for a corresponding transmission channel, with transmission lines being provided on the bottom wall of the blind groove and extending along the extension portions.

10. The multiplexer according to claim 9, wherein, the first frequency blind-holes (A1, B1, C1, D1) provided for four transmission channels which share one common port are positioned around the blind groove which comprises four extension portions each extending from the main portion in the direction of a corresponding first frequency blind-hole (A1, B1, C1, D1).

11. The multiplexer according to claim 10, wherein, every two adjacent extension portions form an angle of about 90 degree.

* * * * *